(12) United States Patent
Denis et al.

(10) Patent No.: US 8,160,327 B2
(45) Date of Patent: Apr. 17, 2012

(54) METHOD FOR GENERATING DIGITAL TEST OBJECTS

(75) Inventors: Eloïse Denis, Nantes (FR); Stéphane Beaumont, Nieul le Dolent (FR); Jean-Pierre Guedon, Orvault (FR); Nicolas Normand, Vigneux-de-Bretagne (FR)

(73) Assignees: Qualiformed SARL, La Roche sur Yon (FR); Université de Nantes, Nantes (FR)

( * ) Notice: Subject to any disclaimer, the term of this patent is extended or adjusted under 35 U.S.C. 154(b) by 827 days.

(21) Appl. No.: 12/288,981

(22) Filed: Oct. 24, 2008

(65) Prior Publication Data

US 2009/0110250 A1    Apr. 30, 2009

(30) Foreign Application Priority Data

Oct. 26, 2007    (FR) ...................................... 07 58612

(51) Int. Cl.
*G06K 9/00*    (2006.01)
(52) U.S. Cl. ......................................... 382/128; 382/130
(58) Field of Classification Search .................. None
See application file for complete search history.

(56) References Cited

U.S. PATENT DOCUMENTS

| 6,449,384 | B2 * | 9/2002 | Laumeyer et al. | ............. | 382/104 |
| 2007/0116357 | A1 * | 5/2007 | Dewaele | ....................... | 382/173 |

OTHER PUBLICATIONS

Denis et al., "Digital reconstructed radiography quality control with software methods," Medical Imaging, 2005, Physics of Medical Imaging, Proceedings of SPIE, vol. 5745, pp. 1002-1013, and corresponding poster.
Denis et al., "Discrete and continuous description of a three dimensional scene for quality control of radiotherapy treatment planning systems," Medical Imaging 2006, Physics of Medical Imaging, Proceedings of SPIE, vol. 6142, pp. 1-12, and corresponding poster. (Spec, p. 12).
Denis et al., "Automatic quality control of digitally reconstructed radiograph computation and comparison with standard methods," Medical Imaging 2007, Physics of Medical Imaging, Proceedings of SPIE, vol. 6510, pp. 1-12, and corresponding poster.

* cited by examiner

*Primary Examiner* — Minh N Tang
(74) *Attorney, Agent, or Firm* — Collard & Roe, P.C.

(57) ABSTRACT

A computer-implemented method for generating digital images encoded into a format readable by medical imaging apparatus defines, in a tridimensional continuous space, a tridimensional scene including a tridimensional continuous shape and an encompassing medium, the tridimensional shape being constituted from basic primary shapes by rotation, translation, overlapping or gathering of one or several basic primary shapes; discretizes the tridimensional scene obtained at the previous step into volume elements (voxels) using a weighting mechanism; segments the discretized tridimensional scene into voxels by creating bidimensional cross-sections of the tridimensional scene; and encodes the information describing the obtained bidimensional cross-sections of the tridimensional scene into a format readable by medical imaging apparatus.

9 Claims, 4 Drawing Sheets

METHOD FOR GENERATING DIGITAL TEST OBJECTS

CROSS-REFERENCE TO RELATED APPLICATIONS

Applicant claims priority under 35 U.S.C. 119 of French patent application No. 0758612 filed on Oct. 26, 2007.

BACKGROUND OF THE INVENTION

The present invention relates to the field of medical image processing, and more particularly to a method for generating digital images in a format readable by medical image processing apparatus, to digital images generated by such a method as well as to a method for the quality control of the medical image processing consoles based on the generated digital images.

Medical image processing consoles are used in many applications, either for a diagnostic purpose, or for a therapeutic purpose, to prepare or perform some treatments, in particular in the radiotherapy field which consists in sterilizing the cancerous tumours by means of high doses of ionizing radiation usually delivered with multiple concentric X-ray beams produced by an linear electron accelerator. Taking into account the potential hazard radiotherapy techniques may involve, the treatments are simulated beforehand on an image processing console referred to as a treatment planning system (TPS).

This treatment planning system comprises in particular a module, called virtual simulation console, allowing the optimisation of the radiation geometry by defining a set of concentric radiation beams allowing to homogeneously irradiate the full volume of the tumour, while protecting as much as possible the healthy tissues surrounding the tumour.

The virtual simulation console works on the patient's digital images, obtained by exploring the patient by means of a X-ray scanner associated with the virtual simulation console. The scanner provides a set of tomographic cross-sections of the patient, which will constitute digital images to be processed by the virtual simulation console to build up a tridimensional virtual patient which will be used to determine the optimal irradiation geometric conditions previously defined.

This geometric optimization is performed on the Virtual Simulation (VS) console by means of various software tools (contouring, expansions, positioning of the beam intersection point, incidence selection, conforming the beam boundaries, positioning cutaneous marks, production of reference views, etc.) that should be tested because their performances directly determine the virtual simulation quality, and hence the treatment quality.

BRIEF SUMMARY OF THE INVENTION

In particular, the invention consists in performing this kind of quality control by means of digital test objects directly obtained by means of a dedicated software which encodes them in a format readable by any medical image processing platform.

The current method for performing these quality controls consists in scanning physical phantoms (test objects) by means of a scanner associated with the console to obtain their digital "equivalents", readable by the virtual simulation console. The digital test objects thus obtained are input in the virtual simulation console and are processed by the various tools to be tested on the virtual simulation console.

The processing results of the physical object scanned and then processed by the console by means of the software tool to be tested are estimated either visually or by using measurement software tools (distance, image intensity, . . . ), and these results are compared to the expected results.

This method has several drawbacks:
- before each treatment simulation, the scanner has to be reserved to scan the physical test object, which limits the scanner time of use for the patients;
- the control of the inherent performances of the virtual simulation console is biased due to the fact that the virtual simulation console does not work on perfect images of the physical test object (PTO), but on images obtained and thus already altered by a scanner. This leads to the fact that, when comparing the result of the processing by the virtual simulation console to the expected result, not only the processing done by the virtual simulation console alone is controlled, but also the processing done by the scanner and then the virtual simulation console. In terms of quality control of a chain of medical devices allowing to perform a diagnostic or a treatment, each device of the chain can is expected to be individually tested. The method currently used only allows to perform a quality control on the scanner & virtual simulation assembly, not on the virtual simulation assembly alone;
- the time required for the quality control comprising the TPO image acquisition sequence by the scanner and then the processing by the virtual simulation console is lengthened;
- finally, taking into account the machining complexity of the materials they involved, the PTO are manually limited and/or adjustable, which leads to incomplete and/or inaccurate quality controls.

The subject-matter of the present invention is a computer-implemented method, consisting in generating digital test objects (DTO) in a format readable by a medical imaging apparatus, for example in the DICOM format.

The benefits of such a method for generating DTO are multiple:
- scanning a physical test object is no more needed to obtain a digital test object, which represents a substantial time saving for the image processing apparatus test procedure and allows to make the scanner available for the patients;
- the scanner not being used, only the inherent performances of the image processing apparatus are tested, which is more accurate from the image processing console quality control point of view, the bias brought by the scanner in the prior art being not included anymore;
- the DTO generated by the method of the present invention are easily and quickly created, which reduces their cost and hence the image processing apparatus test cost;
- this production cost reduction allows to contemplate a far more comprehensive set of DTO, and therefore to perform thorougher and more comprehensive tests, which eventually enhances the medical image processing apparatus performances;
- the DTO generated by the method of the present invention are more upgradeable than the ones generated by the prior art and thus can better follow the evolutions and regulations in the field of the medical image processing console quality control;
- the perfect management of the DTO production process offered by the present invention allows to know more fully and accurately the DTO and so to perfectly know the expected results of the processings by the image processing console. In the end, the tests performed with the DTO produced according to the present invention are far more accurate;

since the input DTO produced according to the present invention are perfectly known, test sequences of image processing apparatus can be created by creating expected output DTO and comparing the expected output DTO to the ones produced by the input DTO processing by the image processing apparatus. The test result processing of the image processing apparatus may then be fully automated, which enhances their accuracy and reduces the control durations.

The subject-matter of the present invention is a computer-implemented method for generating digital images encoded into a format readable by medical imaging apparatus, characterized in that it comprises the steps of:

defining, in a tridimensional continuous space, a tridimensional scene comprising a tridimensional continuous shape and an encompassing medium, said tridimensional shape being constituted from basic primary shapes by rotation, translation, overlapping or aggregating one or several basic primary shapes;

discretizing the tridimensional scene obtained at the previous step into volume elements (voxels) using a weighting mechanism;

segmenting the discretized tridimensional scene into voxels by creating bidimensional cross-sections of the tridimensional scene; and encoding the information describing the obtained bidimensional cross-sections of the tridimensional scene into a format readable by medical imaging apparatus.

A density (or signal intensity) can be associated with one or several primary shapes of the tridimensional scene.

One or several primary shapes of the tridimensional scene can be colorized to clarify their display in the tridimensional scene.

The weighting mechanism used at the discretization step can be a binary weighting mechanism: each voxel, depending on the position of its center, belongs either to the tridimensional shape, or to the encompassing medium.

The weighting mechanism used at the discretization step can be a mechanism in which a density is allocated to the voxel of the tridimensional scene, according to the volume of each of the primary shapes and the volume of the encompassing medium included in the voxel.

The format readable by medical imaging apparatus can be the DICOM format.

Another object of the present invention is a computer program product, characterized in that it comprises commands adapted for the execution of the steps of the above-defined method.

Another object of the present invention is a method for the quality control of medical image processing consoles, characterized in that it comprises the steps of:

generating Digital Test Objects using the above-defined image generation method;

inputting to the medical image processing console the digital test objects generated at the previous step to obtain output digital images as outputs of the medical image processing console to be tested;

comparing the output digital images obtained at the previous step to reference output digital images obtained or not using the above-defined image generation method.

Another subject-matter of the present invention is a system for carrying out the above-defined method for the quality control of medical image processing consoles, characterized in that it comprises:

an image processing console to be tested;
input DTOs;
reference output DTOs;
result output DTOs derived from the processing of the input DTOs by the image processing console to be tested;
a computer implementing the above-defined computer program product, as well as digital image comparison and processing tools.

BRIEF DESCRIPTION OF THE SEVERAL VIEWS OF THE DRAWING

In order to better illustrate the subject-matter of the present invention, a preferred embodiment is described thereafter, together with the accompanying Figures on which.

DETAILED DESCRIPTION OF THE INVENTION

Figure 1:
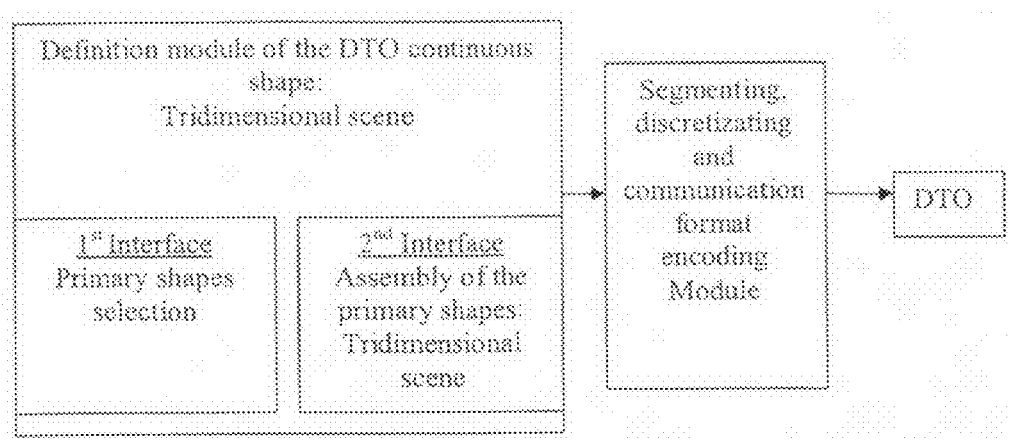
FIG. 1 represents the two software modules allowing to carry out the DTO generation method according to the invention.

As can be seen on FIG. 1, the software carrying out the digital test object generation method comprises two main modules.

The first module is a module that allows to define the tridimensional continuous shape of the digital test object from basic primary shapes. The second module allows to discretize and segment the obtained tridimensional continuous shape into volume elements (voxels) into bidimensional cross-sections. Finally, this second module encodes the bidimensional cross-sections into a format readable by medical imaging apparatus, for example into DICOM format.

The first module for defining the DTO continuous shape from basic primary shapes contains two distinct interfaces.

The first interface, the "shape" interface, allows to individually define each basic primary shape, and possibly apply translations and rotations to these basic primary shapes.

The basic primary shapes can be, for example:
a point, which is then a voxel the center of which is specified in the interface coordinate system;
a pyramid, which is then a rectangular base pyramid, truncated or not, defined by the two diameters of its output face, the two diameters of its input face and its height;
an elliptical base cone, truncated or not, defined similarly to the pyramid;
an ellipsoid, defined by three diameters defined with real number of voxels.

A reference point is associated with each primary shape. This point is used as a rotation center for rotations applied in the "shape" interface.

In order to model the density of various human tissues, density characteristics of the basic primary shape may be added to the geometrical characteristics of these basic primary shapes.

The basic primary shapes may also be colorized in order to, for example, better view the different shapes and densities of the modelled tissues.

The basic primary shapes may undergo in the "shape" interface translations with respect to the three directions of space and rotations around their reference point defined by the user.

The second interface, the "scene" interface, allows to aggregate, in a tridimensional continuous space, the primary shapes, defined in the first interface, within a tridimensional scene, comprising the tridimensional continuous shape formed by aggregating the basic primary shapes and an encompassing medium.

The basic primary shapes are aggregated in the second interface into a composite shape by means of a Boolean operator selected by the user among the following three types: union, intersection and subtraction.

During this Boolean operation, the user specifies which one of the two densities is assigned to the area shared by the two shapes. For the other areas, the composite area keeps the density of the shape it derives from.

In the second interface, the shapes may undergo translations with respect to the three directions of the space and rotations around the origin of the overall scene coordinate system.

The second interface also allows to edit a shape, which consists in going back to the "shape" interface, copy a shape, delete a shape and tie or untie the primary and/or composite shapes to apply them common transformations (translations or rotations).

At last, the user can modify the order of the composite and primary shapes in the "scene" interface so as to define the final density that will be taken into account in the shape overlapping areas: the first shape in the list will prevail on the following shapes.

Figure 2:
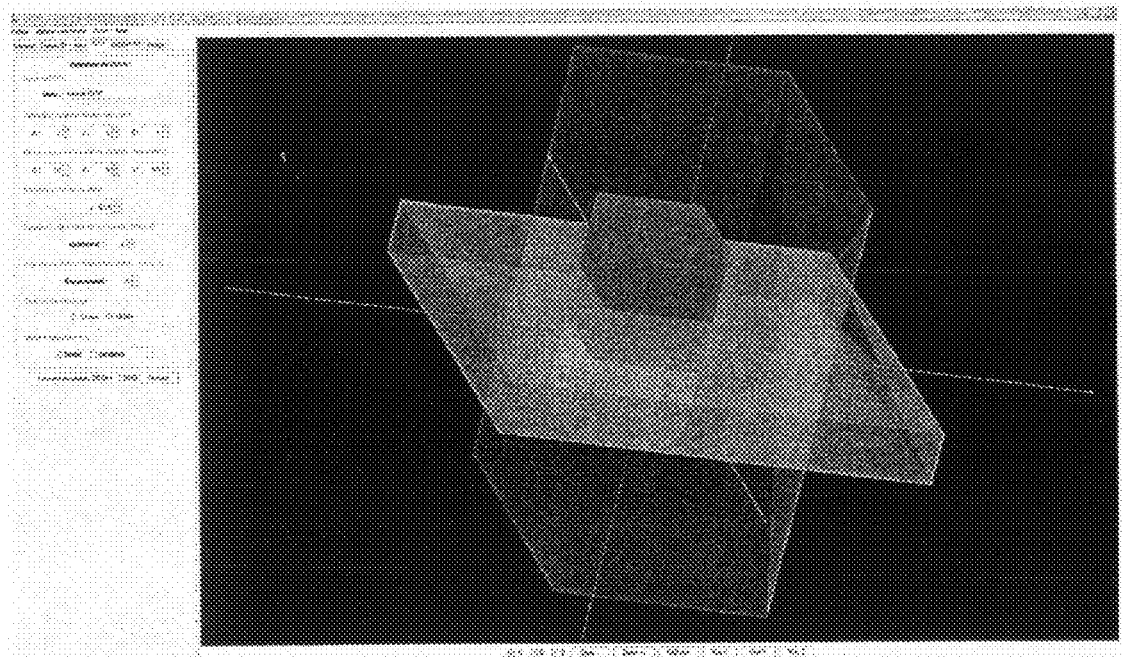
FIG. 2 is an exemplary illustration of a perspective view of a tridimensional continuous shape obtained from the first module of the software carrying out the digital image generation method according to the invention.

A tridimensional continuous shape is obtained as output of the first module, an example of which is illustrated on FIG. 2.

In the example of FIG. 2, the obtained tridimensional scene is composed of three rectangular parallelepiped. Two among the three rectangular parallelepiped have a common longitudinal direction, the smallest of these two parallelepipeds being included in the larger. These two parallelepipeds form the tridimensional scene. A third parallelepiped, which has a longitudinal direction perpendicular to the longitudinal direction of the two other parallelepipeds, represents the volume that will be segmented and the encompassing medium. The segmentation Y axis is here the longitudinal direction of the two first parallelepipeds.

The software encodes and stores all the information that characterizes the tridimensional scene, including primary shapes and/or composite shapes under the form of trees in a XML file. The three root is the complete scene, each leaf representing a primary shape. Each tree node is thus a Boolean composition of shapes that include attributes relating to the transformations applied to the shape it represents.

The second software module is the module for discretizing the tridimensional continuous scene into voxels, segmenting into pixelated bidimensional cross-sections (pixel: picture element) and encoding the cross-sections into a format readable by medical imaging apparatus, for example DICOM for the imaging apparatus or DICOM-RT for the radiotherapy apparatus.

In the end, this module allows, from the tridimensional continuous formed using the first software module, to obtain bidimensional cross-sections discretized into picture elements (or pixels) of this continuous shape and encoded into a format readable by medical imaging apparatus.

In this module, the user defines the voxel size in mm, the dimensions and density of the medium encompassing the tridimensional scene, the thickness of the cross-sections and their spacing in mm and the dynamics of density encoding.

A discretization mechanism that could be used is disclosed in the article *Proceedings of SPIE, Medical Imaging* 2006: *Physics of medical imaging*, volume 6142, SPIE, 2006, and consists in binarly discretizing the volume, each voxel belonging to the shape if its center belongs to the shape, and then creating images of the sections depending on their volume and their spacing.

Another discretization mechanism is also available on the software and allows to define for each voxel a shape weighted belonging, by assigning a density to the voxel, according to the volume of the voxel belonging to the shape. This volume is approximated by segmenting each voxel into sub-voxels.

The second module also includes calibrated functions to alter the cross-sections images, such as the Noise, the Fuzzyness and the partial volume effect to model the influence of these factors on the DTO.

Once the overall scene has been discretized into voxels, including the encompassing medium, by using one of the above-defined discretization mechanisms, the software segments the discrete volume in the Y axis direction in order to create bidimensional cross-sections of the DTO, the thickness and spacing of the sections being given in voxels.

Once the tridimensional scene has been discretized and segmented, the module allows the encoding of the files corresponding to the image of the cross-sections into a format readable by medical imaging apparatus, for example into the DICOM format.

Figure 3:
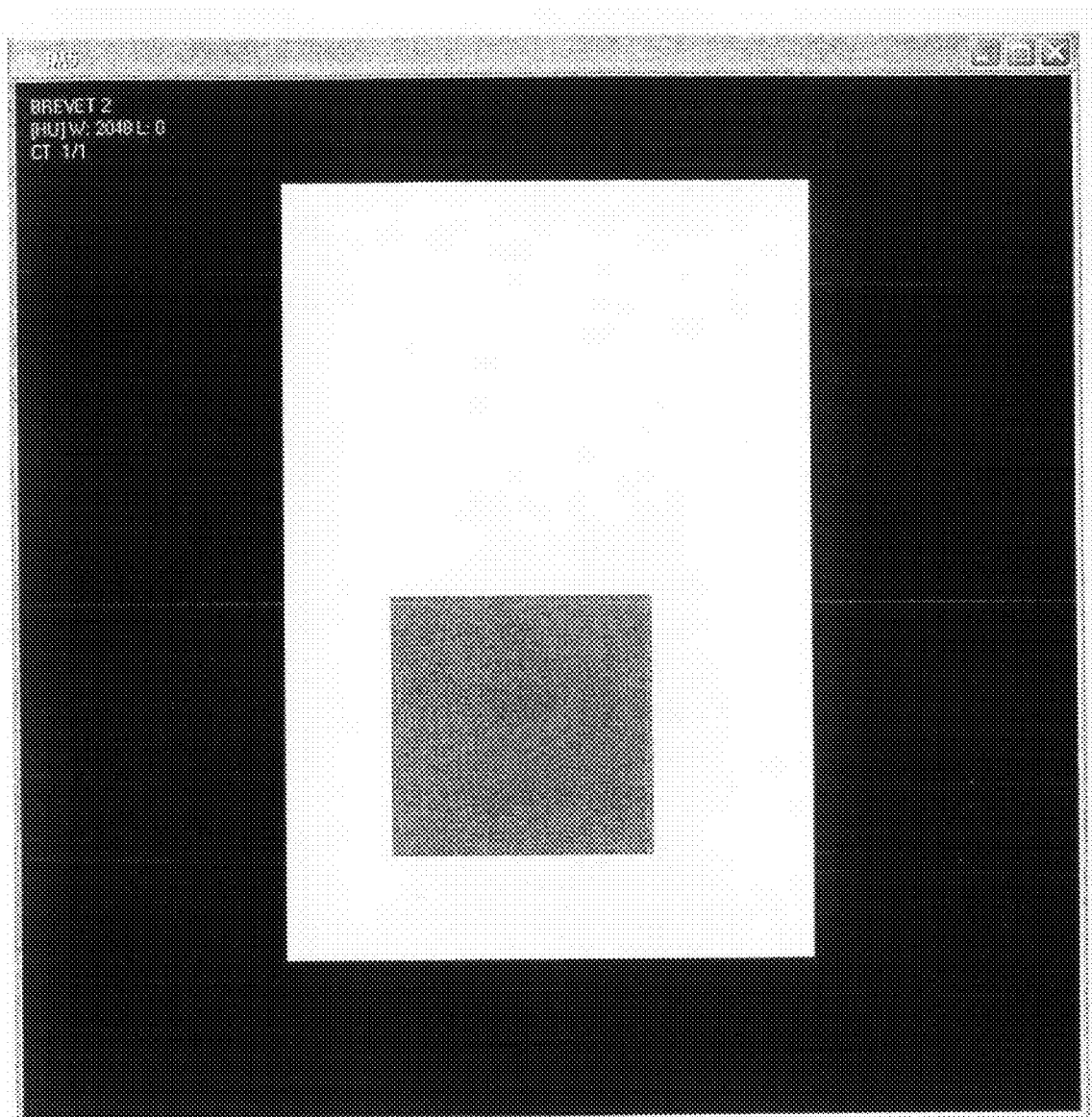
FIG. 3 is an exemplary illustration of the cross-sections obtained from FIG. 2 with the second module of the software carrying out the digital image generation method according to the invention.

The cross-sections along the Y axis (longitudinal direction of the two first parallelepipeds of FIG. 2) obtained as outputs of the second module for the tridimensional scene of FIG. 2 are illustrated in FIG. 3.

The XML file describing the scene is completed in the second module to give the DTO all the information required for its discretization into voxels, its segmentation into bidimensional cross-sections and the encoding of these cross-sections into a format readable by medical imaging apparatus.

Figure 4:
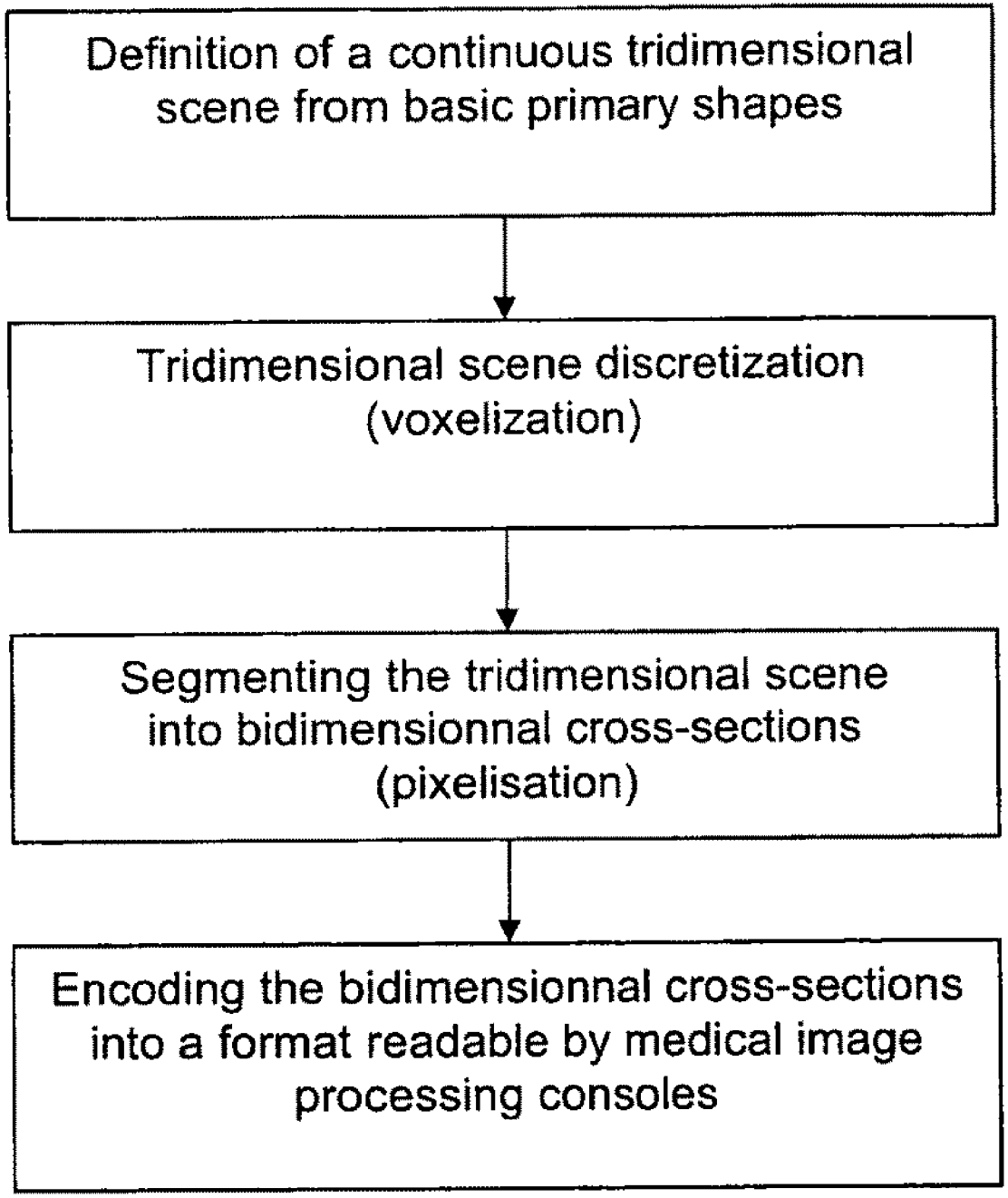
FIG. 4 represents the different steps of the digital test object generation method.

As can be seen on FIG. 4, the DTO generation method comprises the step of:
 defining a tridimensional continuous shape composed from one or several basic primary shapes using the above-described first software module;
 discretizing, segmenting and encoding into DICOM format the tridimensional continuous shape obtained at the previous step, in order to obtain bidimensional cross-sections of this image in the DICOM format.

Figure 5:
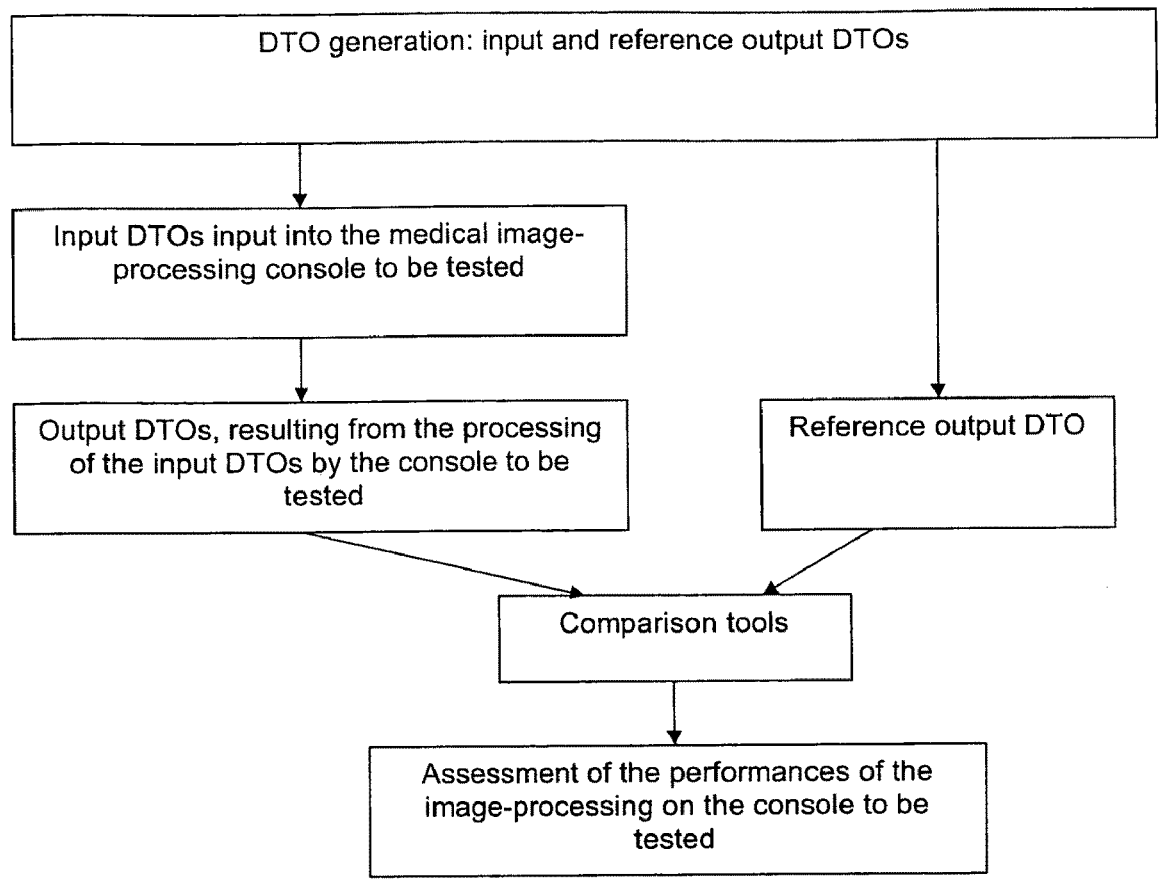
FIG. 5 represents the steps of the method for the quality control of the medical image processing console by means of DTO (input DTO, resulting output DTO, reference output DTO).

FIG. 5 illustrates a method of quality control of medical image processing consoles by means of DTO obtained according to the above-described method.

This method makes use of specific, calibrated DTOs for the test of one of the tools or image processing of the medical processing console under test. Some of these DTOs, the input DTOs, are inputted to the medical image processing console and processed by this console.

The DTOs obtained as console outputs, the "resulting" output DTOS, are then manually or automatically compared with image comparison software tools to reference output DTOs, also generated according to the image generation method subject-matter of the present invention and corresponding either to a perfect processing of the input DTO by an ideal console exhibiting no defect, or to a processing presenting a perfectly calibrated defect.

This method can be implemented in an automatic system for the image processing console test/control quality.

The invention claimed is:

1. A computer-implemented method for generating digital images encoded into a format readable by medical imaging apparatus, comprising the steps of:
   defining, in a tridimensional continuous space, a tridimensional scene comprising a tridimensional continuous shape and an encompassing medium, said tridimensional shape being constituted from basic primary shapes by rotation, translation, overlapping or aggregating one or several basic primary shapes;
   discretizing the tridimensional scene obtained at the previous step into volume elements (voxels) using a weighting mechanism;
   segmenting the discretized tridimensional scene into voxels by creating bidimensional cross-sections of the tridimensional scene; and
   encoding the information describing the obtained bidimensional cross-sections of the tridimensional scene into a format readable by medical imaging apparatus.

2. Method for generating digital images into a format readable by medical imaging apparatus, according to claim 1, wherein a density is associated with one or several primary shapes of the tridimensional scene.

3. Method for generating digital images into a format readable by medical imaging apparatus, according to claim 1, wherein one or several primary shapes of the tridimensional scene are colorized to clarify their display in the tridimensional scene.

4. Method for generating digital images into a format readable by medical imaging apparatus, according to claim 1, wherein the weighting mechanism used at the discretization step is a binary mechanism, each voxel belonging either to the tridimensional shape if a center of said voxel belongs to the tridimensional shape, or to the encompassing medium if the center of said voxel belongs to the encompassing medium.

5. Method for generating digital images into a format readable by medical imaging apparatus, according to claim 1, wherein the weighting mechanism used at the discretization step is a mechanism in which a density is assigned to the voxel of the tridimensional scene, according to the volume of each of the primary shapes and the volume of the encompassing medium included in the voxel.

6. Method for generating digital images into a format readable by medical imaging apparatus, according to claim 1, wherein the format readable by medical imaging apparatus is the DICOM format.

7. A computer program product comprising machine readable instructions stored on a non-transitory computer-readable storage medium, which when executed by a processing unit, causes the processing unit to perform the method of claim 1.

8. Method for the quality control of a medical image processing console, comprising the steps of:
   a first step comprising generating digital images called digital test objects by:
      in a first substep, defining, in a tridimensional continuous space, a tridimensional scene comprising a tridimensional continuous shape and an encompassing medium, said tridimensional shape being constituted from basic primary shapes by rotation, translation, overlapping or aggregating one or several basic primary shapes;
      discretizing the tridimensional scene obtained at the first substep into volume elements (voxels) using a weighting mechanism;
      segmenting the discretized tridimensional scene into voxels by creating bidimensional cross-sections of the tridimensional scene; and
      encoding the information describing the obtained bidimensional cross-sections of the tridimensional scene into a format readable by medical imaging apparatus;
   inputting to the medical image processing console the digital test objects generated at the first step to obtain output digital images as outputs of the medical image processing console to be tested;
   comparing the output digital images obtained at the previous step to reference output digital images.

9. System comprising:
   an image processing console to be tested;
   input Digital Test Objects (DTOs);
   reference output DTOs;
   resulting output DTOs derived from the processing of the input DTOs by the image processing console to be tested;
   a computer programmed to perform the method of claim 1.

* * * * *